United States Patent
Yoshimura et al.

(10) Patent No.: US 11,832,009 B2
(45) Date of Patent: Nov. 28, 2023

(54) SOLID-STATE IMAGING DEVICE

(71) Applicant: HAMAMATSU PHOTONICS K.K., Hamamatsu (JP)

(72) Inventors: Hidetoshi Yoshimura, Hamamatsu (JP); Yukinobu Sugiyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 440 days.

(21) Appl. No.: 17/276,008

(22) PCT Filed: Sep. 5, 2019

(86) PCT No.: PCT/JP2019/035062
§ 371 (c)(1),
(2) Date: Mar. 12, 2021

(87) PCT Pub. No.: WO2020/059530
PCT Pub. Date: Mar. 26, 2020

(65) Prior Publication Data
US 2022/0038649 A1  Feb. 3, 2022

(30) Foreign Application Priority Data
Sep. 21, 2018  (JP) ................. 2018-177023

(51) Int. Cl.
*H04N 25/767*  (2023.01)
*H04N 25/677*  (2023.01)

(52) U.S. Cl.
CPC ......... *H04N 25/767* (2023.01); *H04N 25/677* (2023.01)

(58) Field of Classification Search
CPC ...... H04N 25/60; H04N 25/65; H04N 25/671; H04N 25/677; H04N 25/767
See application file for complete search history.

(56) References Cited

U.S. PATENT DOCUMENTS

| | | | | |
|---|---|---|---|---|
| 2005/0057189 A1* | 3/2005 | Kimura | ................ | G09G 3/3233 |
| | | | | 315/291 |
| 2005/0162206 A1* | 7/2005 | Kimura | ................ | G09G 3/3283 |
| | | | | 327/203 |

(Continued)

FOREIGN PATENT DOCUMENTS

| | | |
|---|---|---|
| JP | 2009-038531 A | 2/2009 |
| JP | 2009-290703 A | 12/2009 |
| JP | 2010-183462 A | 8/2010 |

OTHER PUBLICATIONS

International Preliminary Report on Patentability dated Apr. 1, 2021 for PCT/JP2019/035062.

*Primary Examiner* — Daniel M Pasiewicz
(74) *Attorney, Agent, or Firm* — Faegre Drinker Biddle & Reath LLP

(57) ABSTRACT

A solid-state imaging device includes a pixel array unit and a current source array unit. The pixel array unit includes N pixel units arrayed in a first direction. Each pixel unit includes a photodiode and an amplification MOS transistor. The current source array unit includes N current sources. Each current source includes a first MOS transistor, a second MOS transistor, a third MOS transistor, a fourth MOS transistor, and a setting circuit. The setting circuit sets ON/OFF of the third MOS transistor on the basis of a voltage of the signal line, thereby suppressing fluctuations in an amount of current flowing from a Vr supply line to a ground potential supply terminal via a common node and the first MOS transistor.

6 Claims, 10 Drawing Sheets

(56) References Cited

U.S. PATENT DOCUMENTS

| | | |
|---|---|---|
| 2007/0046800 A1 | 3/2007 | Chen et al. |
| 2011/0317056 A1* | 12/2011 | Matsumoto .......... H04N 25/616 348/308 |
| 2013/0088625 A1 | 4/2013 | Iwata et al. |
| 2015/0271424 A1 | 9/2015 | Yamaoka |
| 2018/0084206 A1 | 3/2018 | Saito et al. |
| 2018/0103222 A1 | 4/2018 | Yan |

* cited by examiner

SOLID-STATE IMAGING DEVICE

TECHNICAL FIELD

The present disclosure relates to a solid-state imaging device.

BACKGROUND ART

An active pixel sensor (APS) type solid-state imaging device includes a pixel array unit in which pixel units each including a photodiode and an amplification MOS transistor and the like are arrayed one-dimensionally or two-dimensionally, a signal readout unit that sequentially reads out, to the outside, a signal to be output from each pixel unit to a signal line, and a current source connected to the signal line. The amplification MOS transistor of the pixel unit and the current source connected to each other via the signal line constitute a source follower circuit.

In such an APS type solid-state imaging device, when a certain pixel unit among the plurality of pixel units is shielded from light so that light is not incident on the photodiode of the pixel unit, a magnitude of the signal output from the shielded pixel unit is ideally constant regardless of an intensity of light incident on the photodiodes of the other pixel units. However, in practice, when the intensity of the light incident on the photodiodes of the other pixel units is high, the magnitude of the signal output from the shielded pixel unit may change. Such a phenomenon is called black level fluctuation. Patent Document 1 discloses a configuration intended to solve a problem of the black level fluctuation.

CITATION LIST

Patent Literature

Patent Document 1: Japanese Patent Application Laid-Open Publication No. 2010-183462

SUMMARY OF INVENTION

Technical Problem

With the configuration disclosed in Patent Document 1, the black level fluctuation cannot be sufficiently suppressed.

An object of the present invention is to provide a solid-state imaging device capable of more reliably suppressing black level fluctuation.

Solution to Problem

An embodiment of the present invention is a solid-state imaging device. The solid-state imaging device includes (1) a pixel array unit including a plurality of pixel units arrayed at least in a first direction and each including a photodiode and an amplification MOS transistor, and for outputting a signal according to an amount of charges generated in the photodiode in each of the plurality of pixel units to, among a plurality of signal lines, a signal line provided corresponding to the pixel unit; (2) a current source array unit including a plurality of current sources, each of the plurality of current sources being connected to the corresponding pixel unit among the plurality of pixel units via the signal line; and (3) a signal readout unit for inputting signals input via the plurality of signal lines, and sequentially reading out the signals according to the amounts of charges generated in the photodiodes in the plurality of pixel units.

In the above solid-state imaging device, in the pixel unit, the amplification MOS transistor is provided between a first reference potential supply line extending in the first direction and the signal line, a voltage according to the amount of charges generated in the photodiode is applied to a gate of the amplification MOS transistor, and a signal according to the gate voltage is output from the amplification MOS transistor to the signal line.

In the above solid-state imaging device, each of one or more specific current sources included in the plurality of current sources includes (a) a first MOS transistor provided between a second reference potential supply terminal and a common node and having a gate to which a first bias voltage is applied; (b) a second MOS transistor provided between the common node and the signal line and having a gate to which a second bias voltage is applied; (c) a third MOS transistor provided between the first reference potential supply line and the common node, and (d) a setting circuit for applying a gate voltage according to a voltage of the signal line to a gate of the third MOS transistor to set ON/OFF of the third MOS transistor, and suppressing fluctuations in an amount of current flowing from the first reference potential supply line to the second reference potential supply terminal via the first MOS transistor and the common node.

Advantageous Effects of Invention

According to the embodiment of the present invention, it is possible to suppress black level fluctuation more reliably in the solid-state imaging device.

DESCRIPTION OF EMBODIMENTS

Hereinafter, embodiments for carrying out the present invention will be described in detail with reference to the accompanying drawings. In the description of the drawings, the same elements will be denoted by the same reference signs, without redundant description. The present invention is not limited to these examples.

Figure 1:
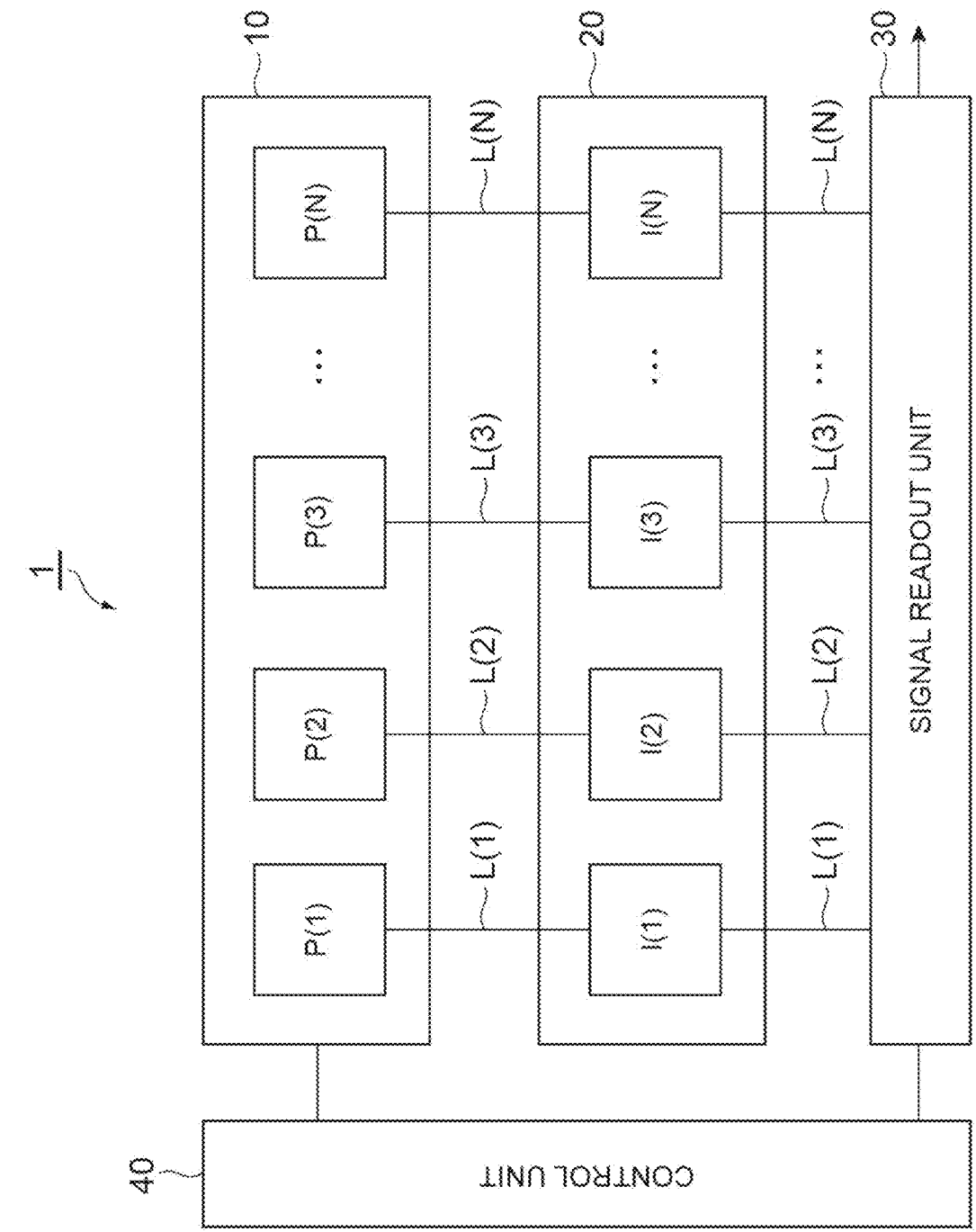
FIG. 1 is a diagram illustrating a configuration of a solid-state imaging device 1.

FIG. 1 is a diagram illustrating a configuration of a solid-state imaging device 1. The solid-state imaging device 1 includes a pixel array unit 10, a current source array unit 20, a signal readout unit 30, and a control unit 40.

The pixel array unit 10 includes a plurality of (N) pixel units P(1) to P(N) arrayed in a first direction. In this figure, the first direction is a lateral direction. The N pixel units P(1) to P(N) are arrayed in this order. Each of the N pixel units P(1) to P(N) includes a photodiode, an amplification MOS transistor, and the like, and the pixel units have a common configuration. The n-th pixel unit P(n) among the N pixel units P(1) to P(N) outputs a signal according to an amount of charges generated in the photodiode to an n-th signal line L(n) among N signal lines L(1) to L(N). The n-th signal line L(n) is provided corresponding to the n-th pixel unit P(n). N is an integer of 2 or more, and n is an integer of 1 or more and N or less.

The current source array unit 20 includes a plurality of (N) current sources I(1) to I(N). It is preferable for the N current sources I(1) to I(N) to be arrayed in this order in the first direction, similar to the N pixel units P(1) to P(N). The amplification MOS transistor of the n-th pixel unit P(n) and the n-th current source I(n) connected by the n-th signal line L(n) constitute a source follower circuit.

The signal readout unit 30 inputs signals input via the N signal lines L(1) to L(N), and sequentially reads out the signals according to the amounts of charges generated in the photodiodes in the N pixel units P(1) to P(N) to the outside. The control unit 40 controls operations of the N pixel units P(1) to P(N) and the signal readout unit 30.

Figure 2:
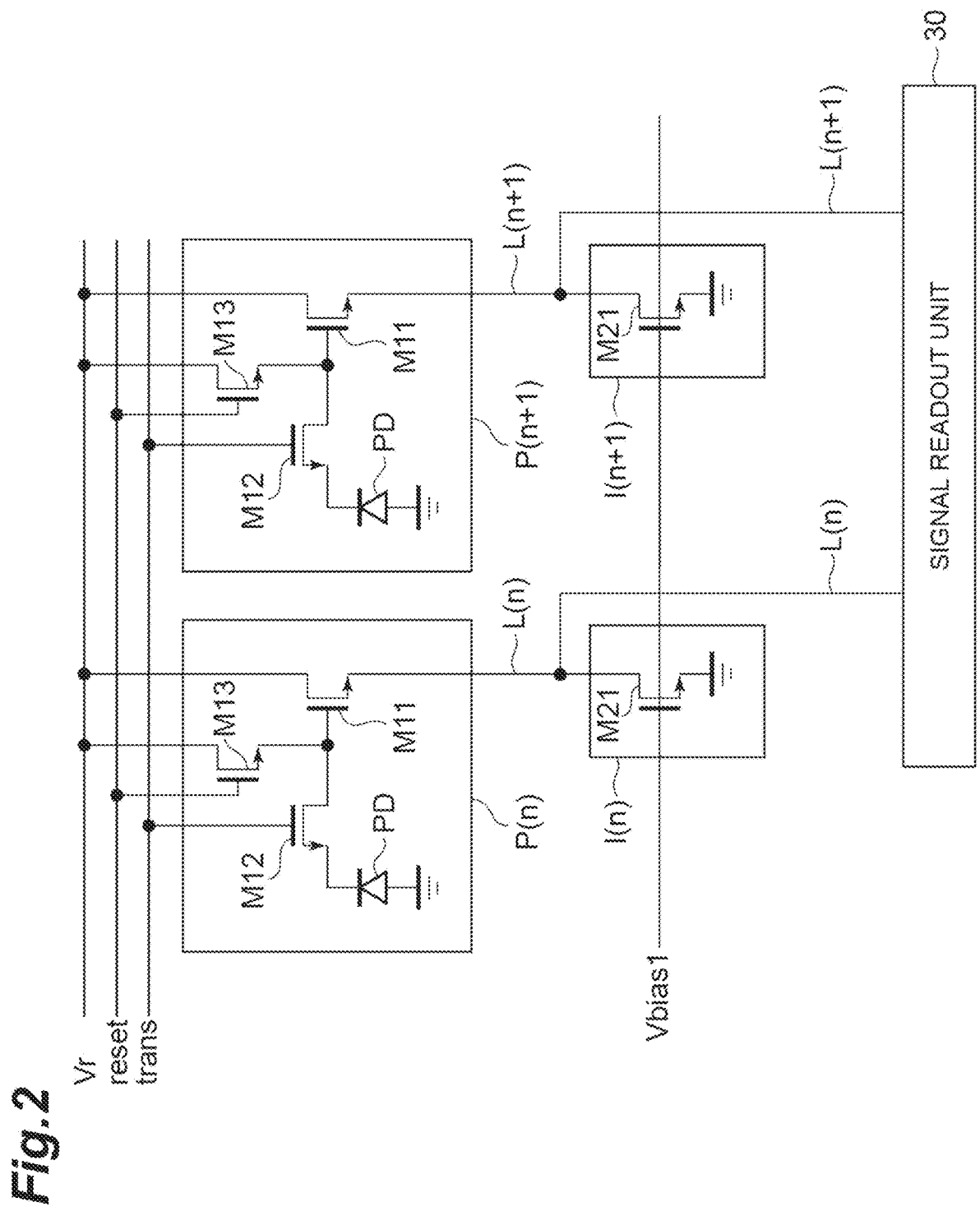
FIG. 2 is a diagram illustrating a circuit configuration of a pixel unit P(n) and a current source I(n).

FIG. 2 is a diagram illustrating a circuit configuration of the pixel unit P(n) and the current source I(n). In this figure, two pixel units P(n) and P(n+1) among the N pixel units P(1) to P(N) are illustrated, and two current sources I(n) and I(n+1) among the N current sources I(1) to I(N) are illustrated. The circuit configuration of the current sources I(n) and I(n+1) illustrated in this figure is a comparative example.

The pixel unit P(n) includes a photodiode PD, an amplification MOS transistor M11, a transfer MOS transistor M12, and an initialization MOS transistor M13. These MOS transistors M11 to M13 are NMOS transistors. A ground potential is applied to an anode of the photodiode PD. A source of the transfer MOS transistor M12 is connected to a cathode of the photodiode PD. A drain of the transfer MOS transistor M12 is connected to a gate of the amplification MOS transistor M11. A trans signal is applied to a gate of the transfer MOS transistor.

A source of the initialization MOS transistor M13 is connected to the gate of the amplification MOS transistor M11. A drain of the initialization MOS transistor M13 is connected to a first reference potential supply line (a Vr supply line) that supplies a first reference potential Vr. A reset signal is applied to a gate of the initialization MOS transistor M13. A source of the amplification MOS transistor M11 is connected to the signal line L(n). A drain of the amplification MOS transistor M11 is connected to the Vr supply line.

The Vr supply line extends in the first direction in which the N pixel units P(1) to P(N) are arrayed. The Vr supply line is a common line for supplying the first reference potential Vr to the drain of the amplification MOS transistor M11 and the drain of the initialization MOS transistor M13 in each of the N pixel units P(1) to P(N).

The trans signal and the reset signal are applied from the control unit 40. When the trans signal is at a low level, the transfer MOS transistor M12 is in an OFF state. When the trans signal is at a high level, the transfer MOS transistor M12 is in an ON state. When the reset signal is at a low level, the initialization MOS transistor M13 is in an OFF state. When the reset signal is at a high level, the initialization MOS transistor M13 is in an ON state.

When the initialization MOS transistor M13 is in the ON state and the transfer MOS transistor M12 is in the OFF state, a potential of a floating diffusion (FD) region connected to the gate of the amplification MOS transistor M11 is initialized. In this case, a value of a signal output from the source of the amplification MOS transistor M11 to the signal line L(n) is also initialized.

When the transfer MOS transistor M12 is put in the ON state after the initialization MOS transistor M13 is put in the OFF state, the charges generated in the photodiode PD and accumulated in a junction capacitance portion of the photodiode PD until then move to the FD region connected to the gate of the amplification MOS transistor M11 via the transfer MOS transistor M12. In this case, a potential of the gate of the amplification MOS transistor M11 corresponds to the amount of charges moved to the FD region. Further, the value of the signal output from the source of the amplification MOS transistor M11 to the signal line L(n) corresponds to the amount of charges transferred to the FD region.

The current source I(n) includes an MOS transistor M21. A drain of the MOS transistor M21 is connected to the signal line L(n). The ground potential is applied to a source of the MOS transistor M21. A bias voltage Vbias1 is applied to a gate of the MOS transistor M21. The MOS transistor M21 operates in a saturation region and can cause a constant current to flow. The amplification MOS transistor M11 of the pixel unit P(n) and the MOS transistor M21 of the current source I(n) are connected by the signal line L(n), and constitute a source follower circuit.

Figure 3:
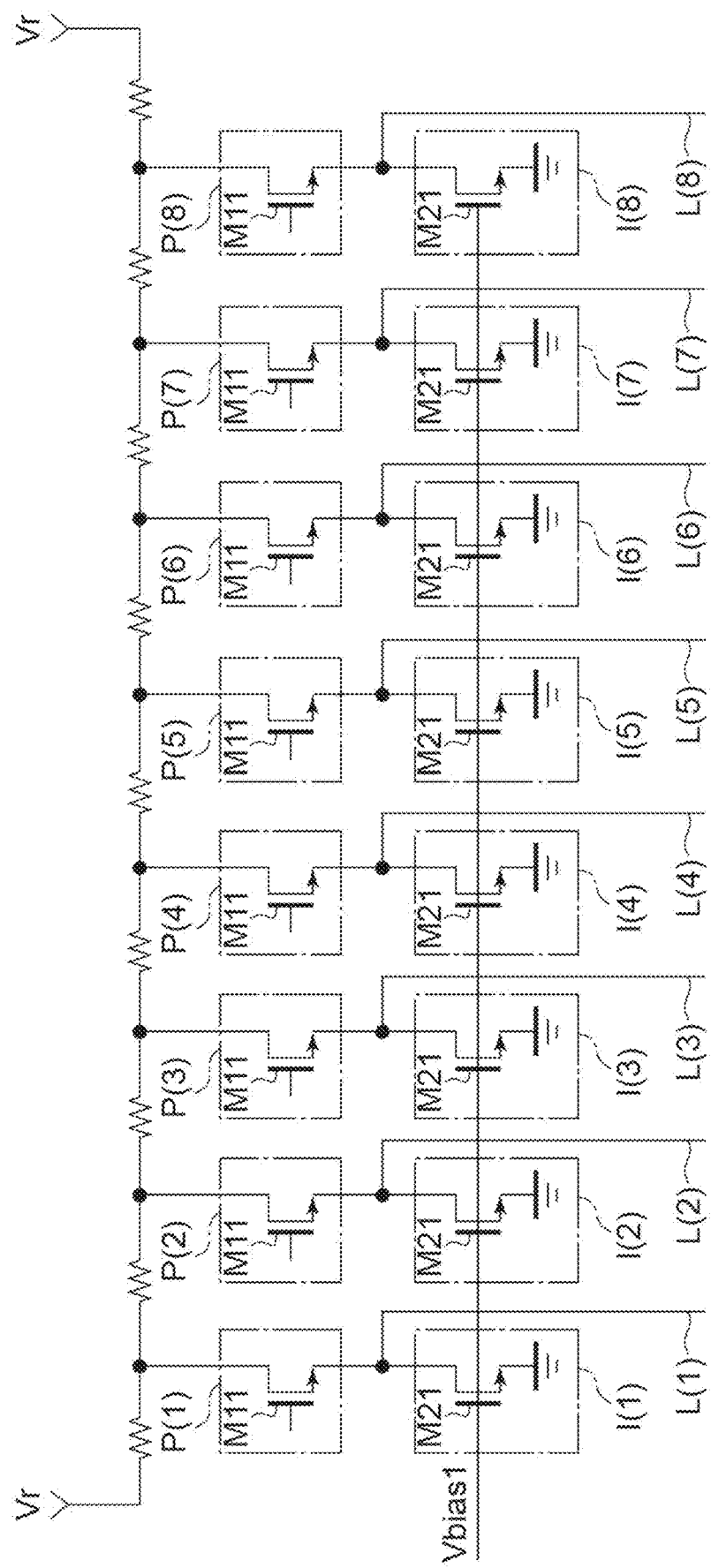
FIG. 3 is a simplified diagram illustrating the circuit configuration of the pixel unit P(n) and the current source I(n).

FIG. 3 is a diagram illustrating a simplified circuit configuration of the pixel unit P(n) and the current source I(n). In this figure, N=8, and only the amplification MOS transistor M11 is illustrated for each pixel unit P(n). Further, in the Vr supply line for supplying the first reference potential Vr to the drain of the amplification MOS transistor M11 of each pixel unit P(n), a resistance component of the supply line is illustrated by a symbol of a resistor. It is assumed that the first reference potential Vr is applied to the Vr supply line from both ends of the supply line.

Normally, when an amount of light incident on the photodiode PD of the pixel unit P(n) is not excessive, the MOS transistor M21 of the current source I(n) corresponding to the pixel unit P(n) operates in the saturation region and can cause a constant current to flow. Hereinafter, this state is referred to as a "normal state".

In the normal state in which the MOS transistors M21 of all the current sources I(n) are operating in the saturation region, a potential to be applied to the drain of the amplification MOS transistor M11 of the pixel unit P(n) differs depending on a position of the pixel unit P(n) due to voltage drop caused by a current flowing through the Vr supply line. That is, when the pixel unit is closer to a center, the potential to be applied to the drain of the amplification MOS transistor M11 of the pixel unit becomes lower.

Meanwhile, it is assumed that an amount of light incident on the photodiodes PD of six pixel units P(1) to P(3) and P(6) to P(8) among the eight pixel units P(1) to P(8) is excessive, the MOS transistors M21 of the current sources I(1) to I(3) and I(6) to I(8) corresponding to these pixel units do not operate in the saturation region, and an amount of current is small. A state of these pixel units is hereinafter referred to as a "saturation state".

When the pixel units P(1) to P(3) and P(6) to P(8) are in the saturation state, the amount of current flowing through the Vr supply line decreases, the voltage drop in the Vr supply line becomes small, and the potential to be applied to the drains of the amplification MOS transistors M11 of the two pixel units P(4) and P(5) at the center becomes higher than that in the above case in which all the pixel units are in the normal state. This is a cause of black level fluctuation.

With the solid-state imaging device 1 of the embodiment to be described below, it is possible to suppress fluctuations in the voltage drop in the Vr supply line to suppress the black level fluctuation.

Figure 4:
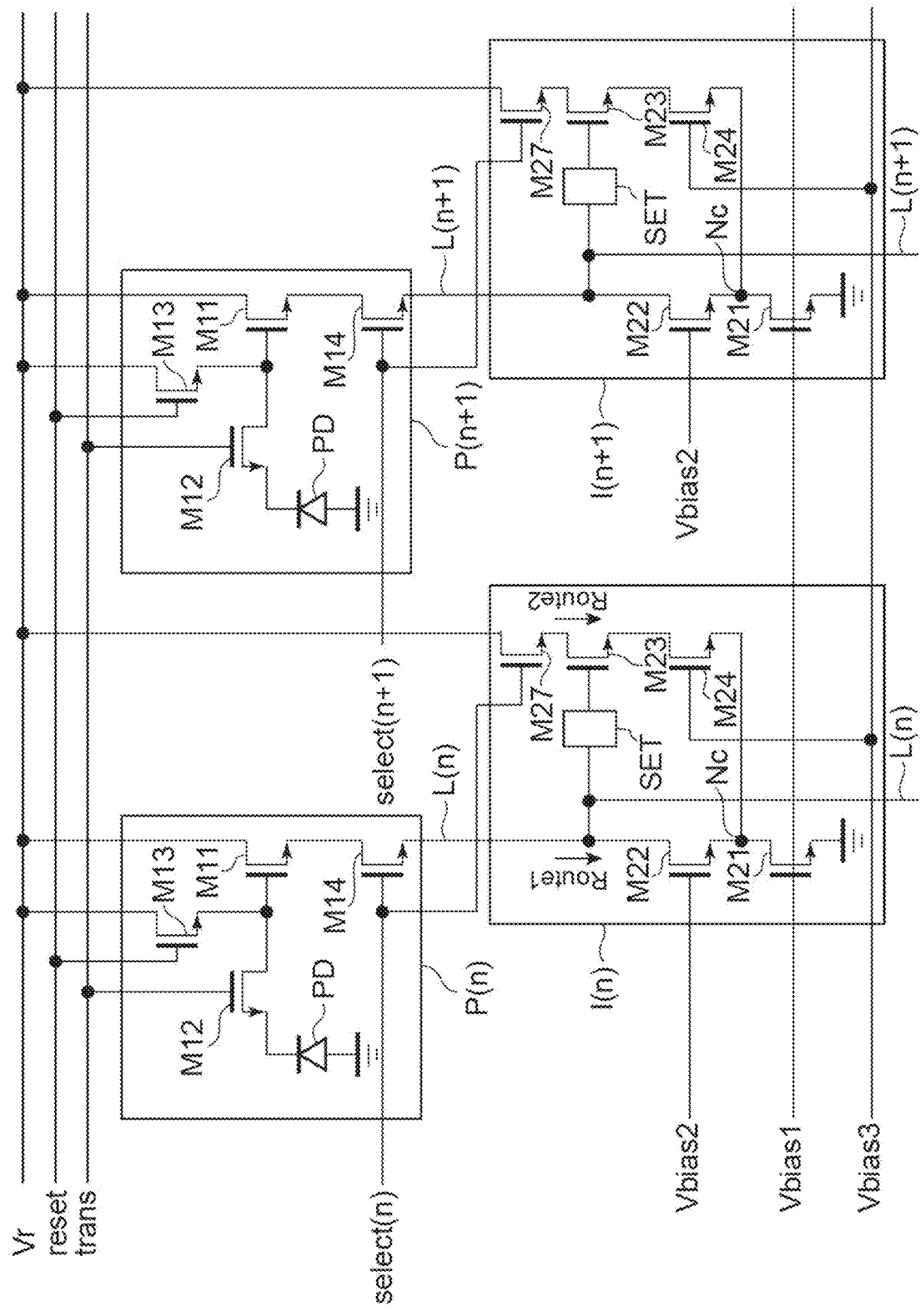
FIG. 4 is a diagram illustrating a circuit configuration of the pixel unit P(n) and the current source I(n) of the solid-state imaging device 1 of the present embodiment.

FIG. 4 is a diagram illustrating a circuit configuration of the pixel unit P(n) and the current source I(n) of the solid-state imaging device 1 of the present embodiment.

The pixel unit P(n) in the present embodiment further includes a selection MOS transistor M14, in addition to the photodiode PD, the amplification MOS transistor M11, the transfer MOS transistor M12, and the initialization MOS transistor M13. The selection MOS transistor M14 is an NMOS transistor. A drain of the selection MOS transistor M14 is connected to the source of the amplification MOS transistor M11. A source of the selection MOS transistor M14 is connected to the signal line L(n) of the amplification MOS transistor M11.

A select(n) signal is applied from the control unit 40 to a gate of the selection MOS transistor M14. When the select(n) signal is at a low level, the selection MOS transistor M14 is put in an OFF state so that the current flowing through the signal line L(n) can be limited. When the select(n) signal is at a high level, the selection MOS transistor M14 is put in an ON state so that the signal can be output from the amplification MOS transistor M11 to the signal line L(n). select(1) to select(N) signals may be common signals.

The current source I(n) in the present embodiment includes a first MOS transistor M21, a second MOS transistor M22, a third MOS transistor M23, a fourth MOS transistor M24, and a setting circuit SET. Further, the current source I(n) also includes an MOS transistor M27. The MOS transistors M21 to M24 and M27 are NMOS transistors.

A drain of the first MOS transistor M21 is connected to a common node Nc. A source of the first MOS transistor M21 is connected to a second reference potential supply terminal (a ground potential supply terminal). A first bias voltage Vbias1 is applied to a gate of the first MOS transistor M21. A drain of the second MOS transistor M22 is connected to the signal line L(n). A source of the second MOS transistor M22 is connected to the common node Nc. A second bias voltage Vbias2 is applied to a gate of the second MOS transistor M22.

A drain of the third MOS transistor M23 is connected to the Vr supply line via the MOS transistor M27. A source of the third MOS transistor M23 is connected to a drain of the fourth MOS transistor M24. The setting circuit SET applies a gate voltage according to the voltage of the signal line L(n) to a gate of the third MOS transistor M23 to set ON/OFF of the third MOS transistor M23. The third MOS transistor M23 is mainly used as a switch of which ON/OFF is set by the setting circuit SET.

A source of the fourth MOS transistor M24 is connected to the common node Nc. A third bias voltage Vbias3 is applied to a gate of the fourth MOS transistor M24. The third bias voltage Vbias3 may differ from the second bias voltage Vbias2 or may be the same as the second bias voltage Vbias2. Although the fourth MOS transistor M24 is provided between the third MOS transistor M23 and the common node Nc in the figure, it may be provided between the Vr supply line and the third MOS transistor M23. The fourth MOS transistor M24 may be omitted.

The MOS transistor M27 may be provided between the Vr supply line and the MOS transistor M23 as illustrated in the figure, and further, it may be provided between the MOS transistor M23 and the MOS transistor M24 or may be provided between the MOS transistor M24 and the common node Nc. The select(n) signal is applied from the control unit 40 to a gate of the MOS transistor M27. When the select(n) signal is at a low level, the MOS transistor M27 is put in an OFF state so that a current flowing through the MOS transistors M23 and M24 can be limited. When the select(n) signal is at a high level, the MOS transistor M27 is put in an ON state so that the current flowing through the MOS transistors M23 and M24 can be allowed.

The setting circuit SET sets ON/OFF of the third MOS transistor M23 on the basis of the voltage of the signal line L(n), thereby suppressing fluctuations in the amount of current flowing from the Vr supply line to the ground potential supply terminal via the common node Nc and the first MOS transistor M21. The voltage of the signal line L(n) corresponds to the gate voltage of the amplification MOS transistor M11.

When an amount of current flowing in a first route Route1 is larger than a certain threshold value, the setting circuit SET sets the third MOS transistor M23 to OFF so that a current does not flow through a second route Route2 from the Vr supply line to the ground potential supply terminal via the third MOS transistor M23. On the other hand, when the amount of current flowing through the first route Route1 is smaller than the certain threshold value, the setting circuit SET sets the third MOS transistor M23 to ON so that the current flows through the second route Route2.

The MOS transistor M14 and the MOS transistor M27 act as a current limiting means for limiting a current flowing in the specific current source I(n) corresponding to the pixel unit P(n) in a period in which the pixel unit P(n) does not output the signal (that is, a period in which the select(n) signal is at a low level). With such a current limiting means, it is possible to suppress power consumption.

In addition, a configuration in which the third bias voltage Vbias3 to be applied to the gate of the MOS transistor M24 is set to a low level in the period in which the select(n) signal is at the low level, a configuration in which the signal to be applied to the gate of the MOS transistor M23 is set as a logical product of the output signal of the setting circuit SET and the select(n) signal, and the like can also be used as the current limiting means.

Figure 5:
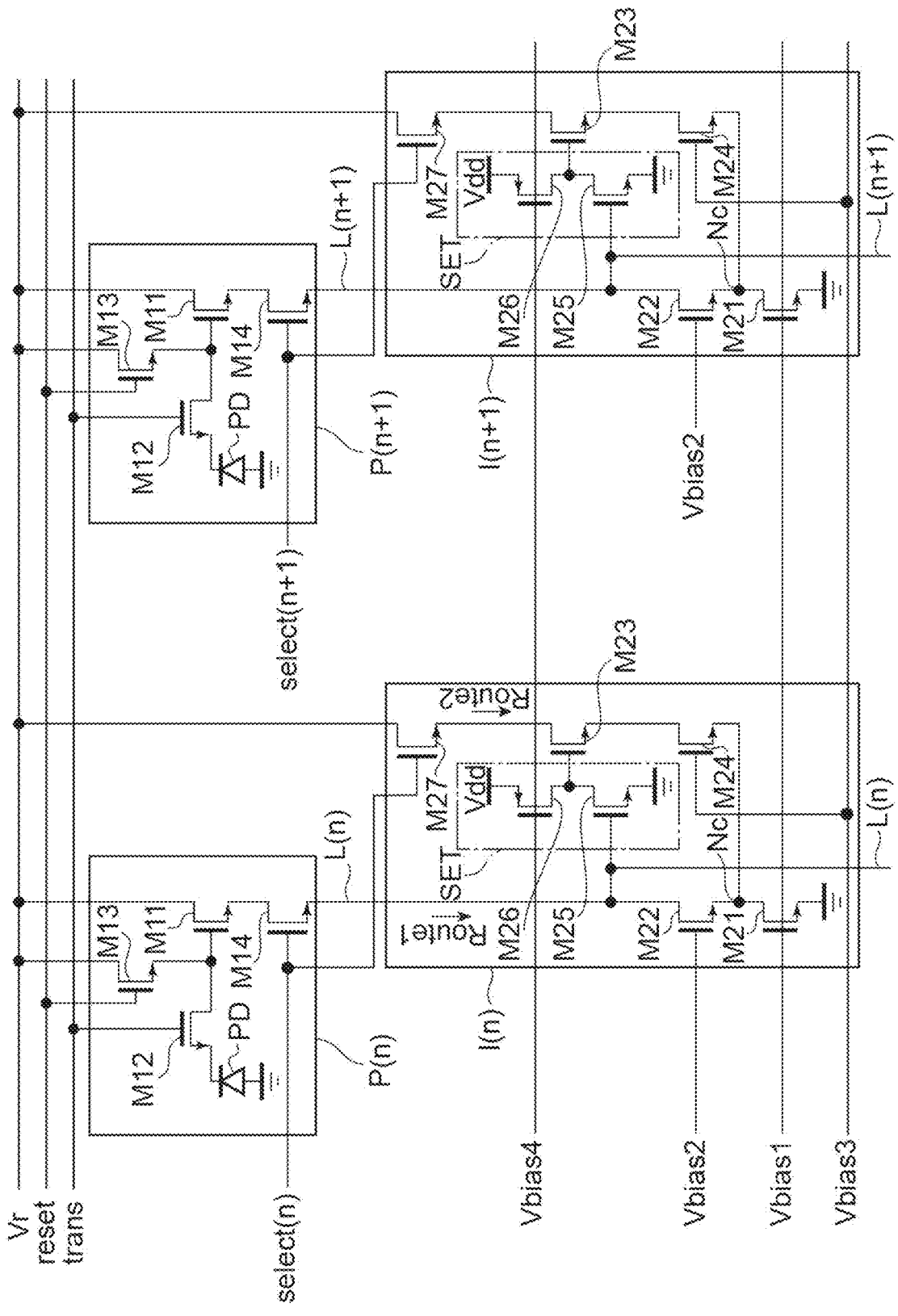
FIG. 5 is a diagram illustrating an example of a specific circuit configuration of the current source I(n) of the solid-state imaging device 1 of the present embodiment.
Figure 6:
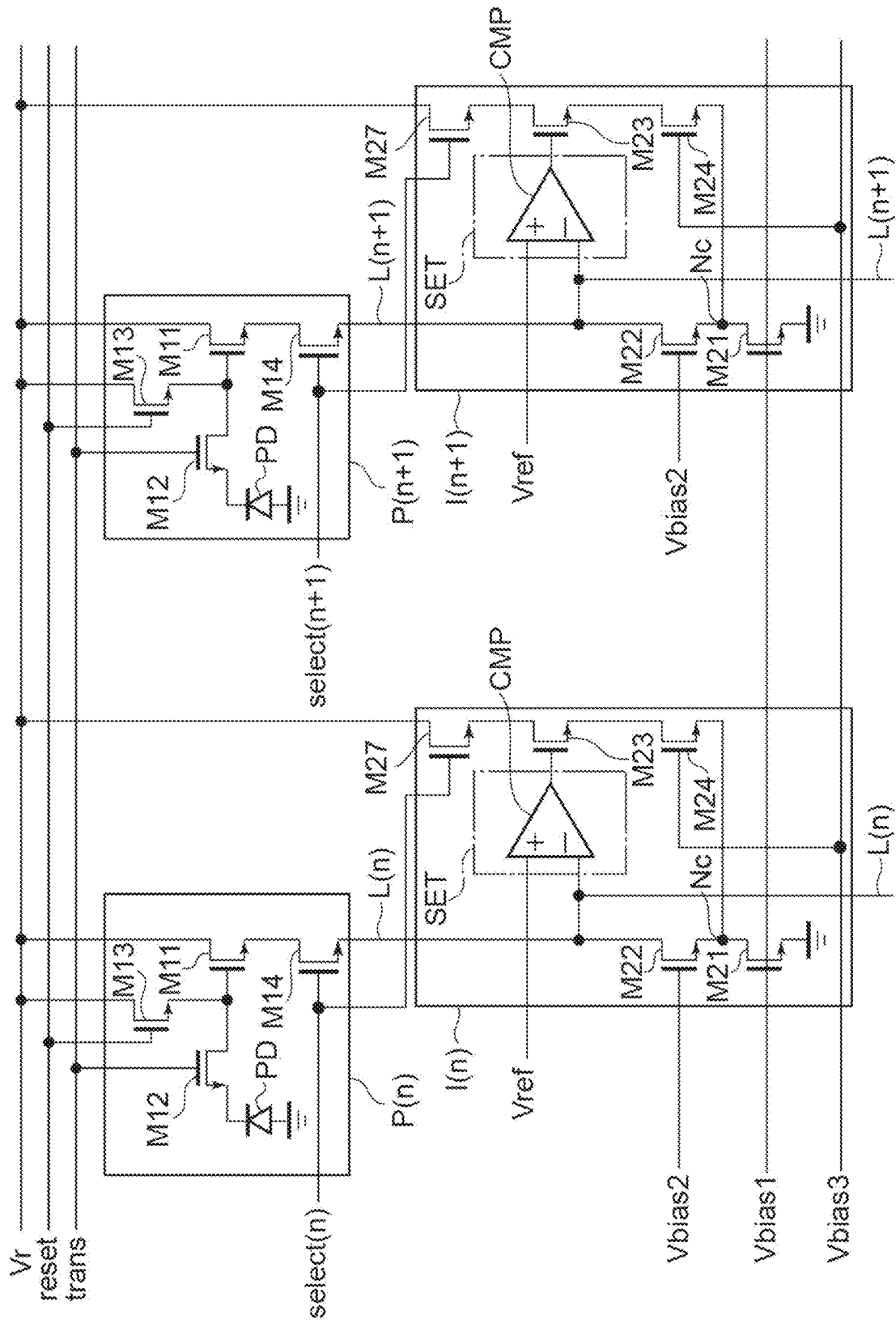
FIG. 6 is a diagram illustrating another example of the specific circuit configuration of the current source I(n) of the solid-state imaging device 1 of the present embodiment.

FIG. 5 and FIG. 6 are diagrams illustrating examples of a specific circuit configuration of the current source I(n) of the solid-state imaging device 1 of the present embodiment.

The setting circuit SET of the current source I(n) illustrated in FIG. 5 has a configuration in which a fifth MOS transistor M25 and a sixth MOS transistor M26 connected in series with each other are included. The fifth MOS transistor M25 is an NMOS transistor, and the sixth MOS transistor M26 is a PMOS transistor.

A drain of the fifth MOS transistor M25 is connected to a drain of the sixth MOS transistor M26, and is further connected to the gate of the third MOS transistor M23. A source of the fifth MOS transistor M25 is connected to the ground potential supply terminal. A gate of the fifth MOS transistor M25 is connected to the signal line L(n).

A source of the sixth MOS transistor M26 is connected to a power potential supply terminal. A fourth bias potential Vbias4 is applied to a gate of the sixth MOS transistor M26. The sixth MOS transistor M26 is always in an ON state when the fourth bias potential Vbias4 is applied to the gate, and is mainly used as a load.

In this setting circuit SET, the voltage of the signal line L(n) is applied to the gate of the fifth MOS transistor M25, and a voltage of a connection point between the fifth MOS transistor M25 and the sixth MOS transistor M26 is applied to the gate of the third MOS transistor M23.

In the normal state, the current flows through the first route Route1, the voltage of the signal line L(n) (that is, a gate voltage of the fifth MOS transistor M25) is sufficiently high, and the fifth MOS transistor M25 is in the ON state. Therefore, since a gate voltage of the third MOS transistor M23 is at a ground potential level, the third MOS transistor M23 is in the OFF state and no current flows through the second route Route2.

In the saturation state, no current flows in the first route Route1, the voltage of the signal line L(n) (that is, the gate voltage of the fifth MOS transistor M25) is low, and the fifth MOS transistor M25 is in the OFF state. Therefore, since the gate voltage of the third MOS transistor M23 is at a power potential level, the third MOS transistor M23 is in the ON state and the current flows through the second route Route2.

The setting circuit SET of the current source I(n) illustrated in FIG. 6 includes a comparator CMP that compares the voltage of the signal line L(n) with a threshold value Vref. The setting circuit SET applies a voltage output from the comparator CMP on the basis of the comparison result to the gate of the third MOS transistor M23. The threshold value Vref is set to about a lower limit value of a voltage range of the signal line L(n) in which the second MOS transistor M22 can operate in the saturation region.

In the normal state, since the voltage of the signal line L(n) is larger than the threshold value Vref, the voltage output from the comparator CMP is at a low level, the third MOS transistor M23 is in the OFF state, and no current flows through the second route Route2. On the other hand, in the saturation state, since the voltage of the signal line L(n) is smaller than the threshold value Vref, the voltage output from the comparator CMP is at a high level, the third MOS transistor M23 is in the ON state, and the current flows through the second route Route2.

Figure 7:
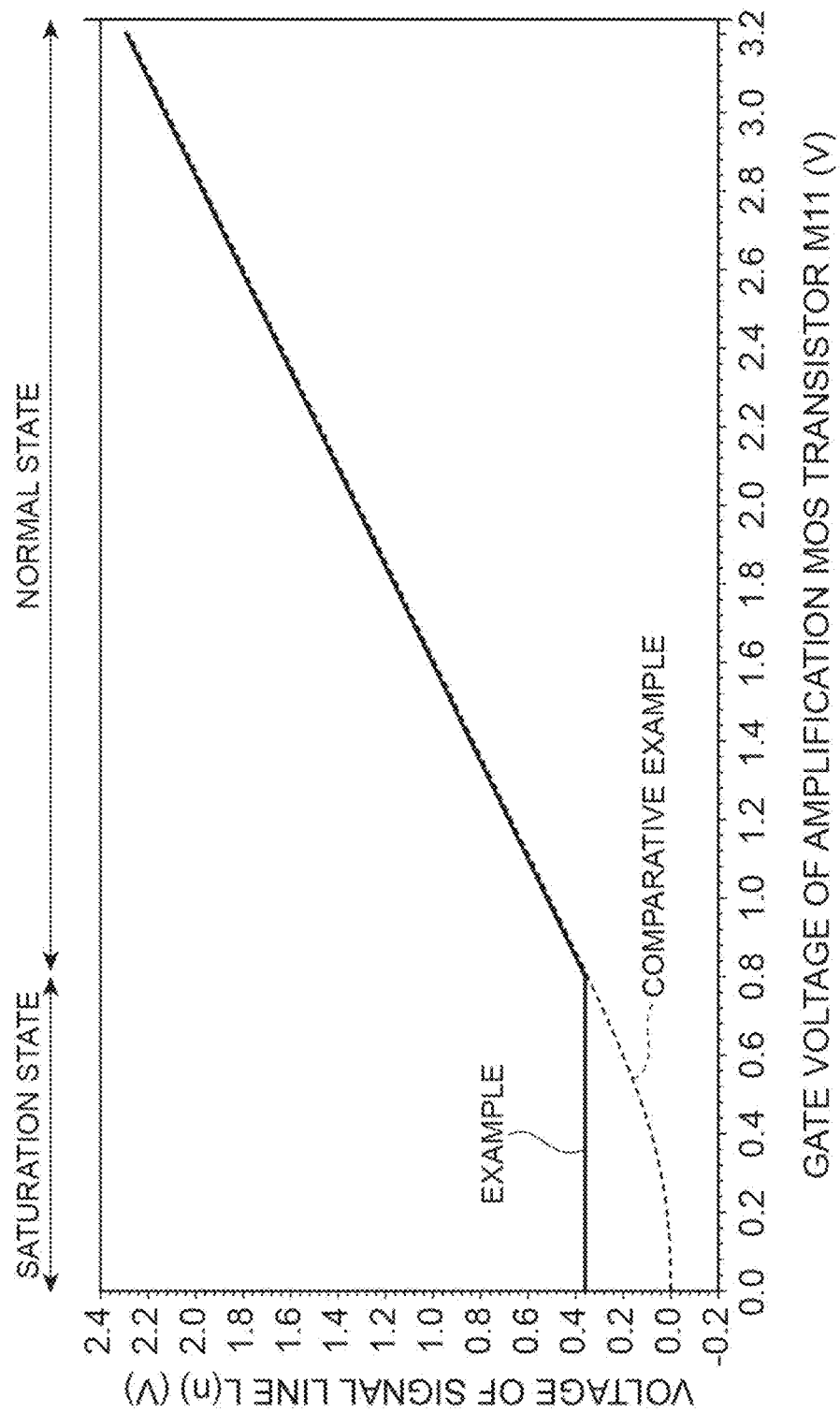
FIG. 7 is a diagram illustrating simulation results of a relationship between a gate voltage of an amplification MOS transistor M11 and a voltage of a signal line L(n) in an example and a comparative example.
Figure 8:
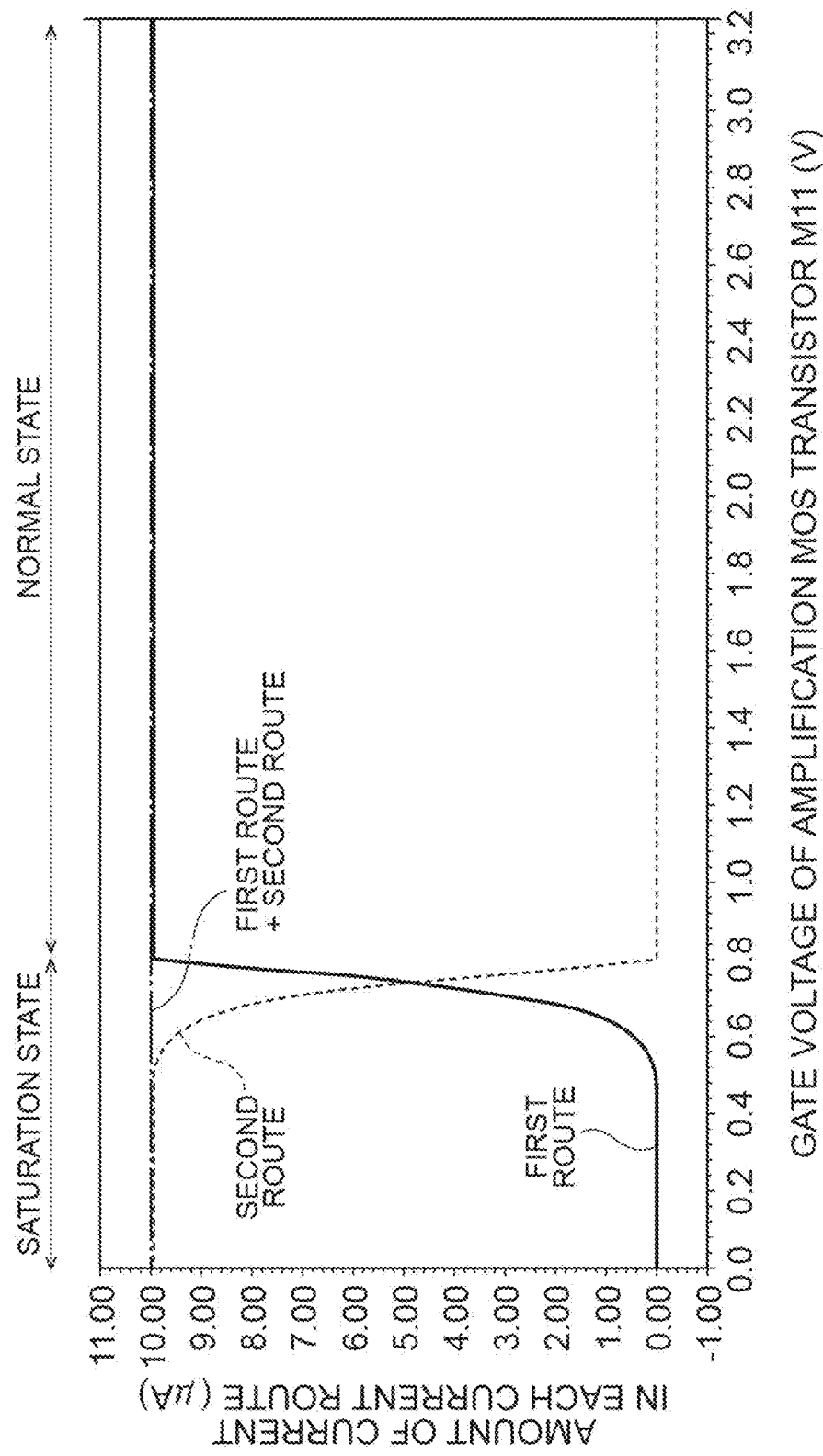
FIG. 8 is a diagram illustrating simulation results of a relationship between the gate voltage of the amplification MOS transistor M11 and an amount of current in each route in the example.

FIG. 7 and FIG. 8 are diagrams illustrating simulation results of an example in which the circuit configuration example of the current source I(n) illustrated in FIG. 5 is adopted. A horizontal axis in these figures indicates a gate voltage of the amplification MOS transistor M11. When the amount of light incident on the photodiode PD is larger, the gate voltage of the amplification MOS transistor M11 becomes lower.

FIG. 7 is a diagram illustrating simulation results of a relationship between the gate voltage of the amplification MOS transistor M11 and the voltage of the signal line L(n) in the example and the comparative example.

In the normal state, the relationship between the gate voltage of the amplification MOS transistor M11 and the voltage of the signal line L(n) is the same between the example and the comparative example. In the normal state, when the amount of light incident on the photodiode PD becomes larger, the gate voltage of the amplification MOS transistor M11 becomes lower and the voltage of the signal line L(n) becomes lower. In the comparative example, when the saturation state is reached and the amount of light incident on the photodiode PD becomes larger, the voltage of the signal line L(n) becomes lower, but a degree of voltage reduction becomes smaller. On the other hand, in the example, even when the saturation state is reached and the amount of light incident on the photodiode PD becomes larger, the voltage of the signal line L(n) is substantially constant.

FIG. 8 is a diagram illustrating simulation results of the relationship between the gate voltage of the amplification MOS transistor M11 and the amounts of current in respective routes in the example.

In the normal state, a constant current flows through the first route Route1, whereas no current flows through the second route Route2. When the saturation state is reached and the amount of light incident on the photodiode PD becomes larger, the amount of current in the first route Route1 decreases sharply and the amount of current in the second route Route2 increases sharply and, finally, no current flows through the first route Route1 and a constant current flows through the second route Route2. A sum of the amounts of current in the first route Route1 and the second route Route2 is maintained constant regardless of the amount of light incident on the photodiode PD in both the normal state and the saturation state.

That is, the amount of current flowing from the Vr supply line to the ground potential supply terminal via the common node Nc and the first MOS transistor M21 is maintained constant in both the normal state and the saturation state. Therefore, even when any one of the pixel units is in a saturation state, there is no change in the amount of current flowing through the Vr supply line and there is no change in the voltage drop in the Vr supply line, so that the black level fluctuation is sufficiently suppressed.

Figure 9:
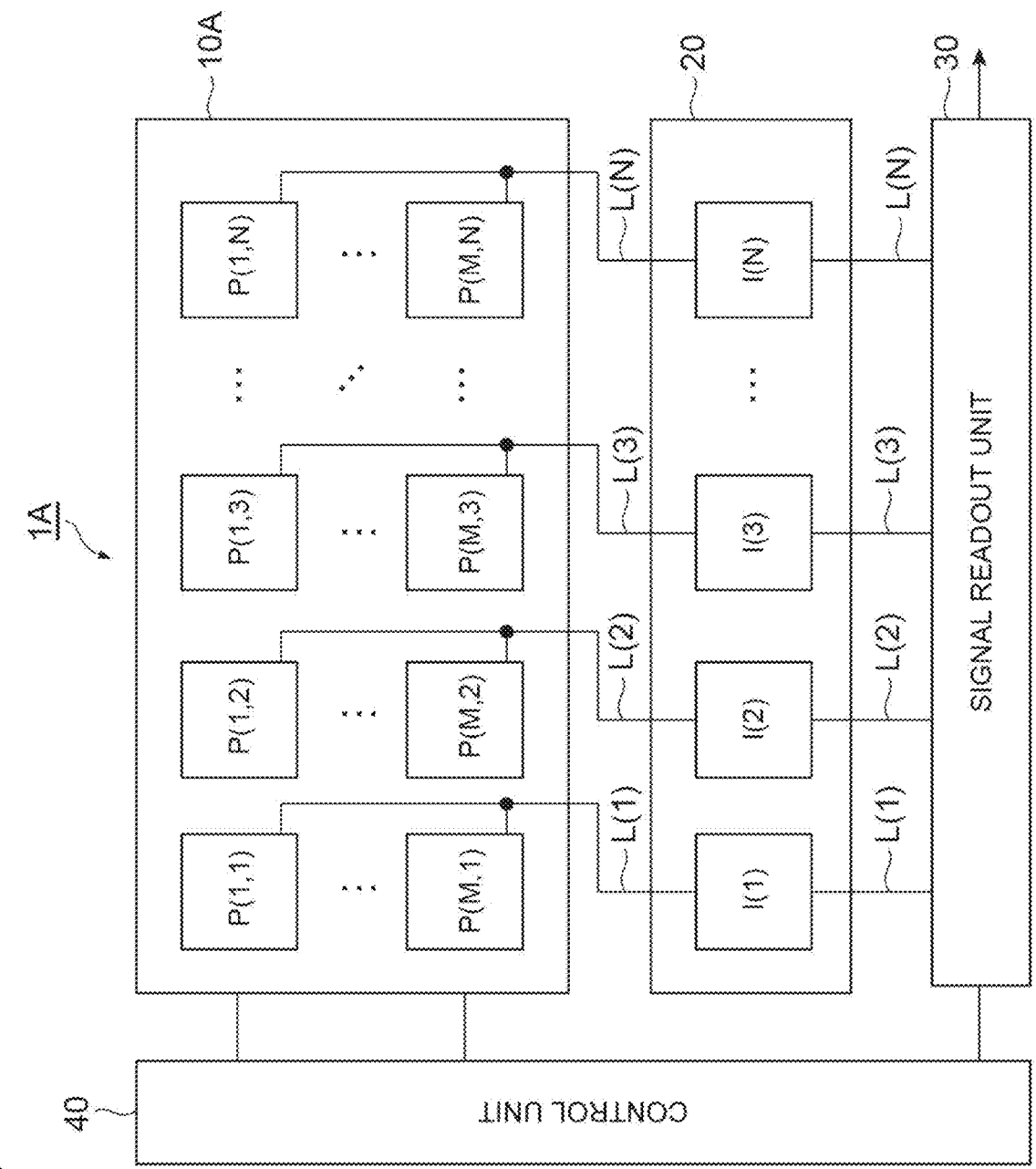
FIG. 9 is a diagram illustrating a configuration of a solid-state imaging device 1A.
Figure 10:
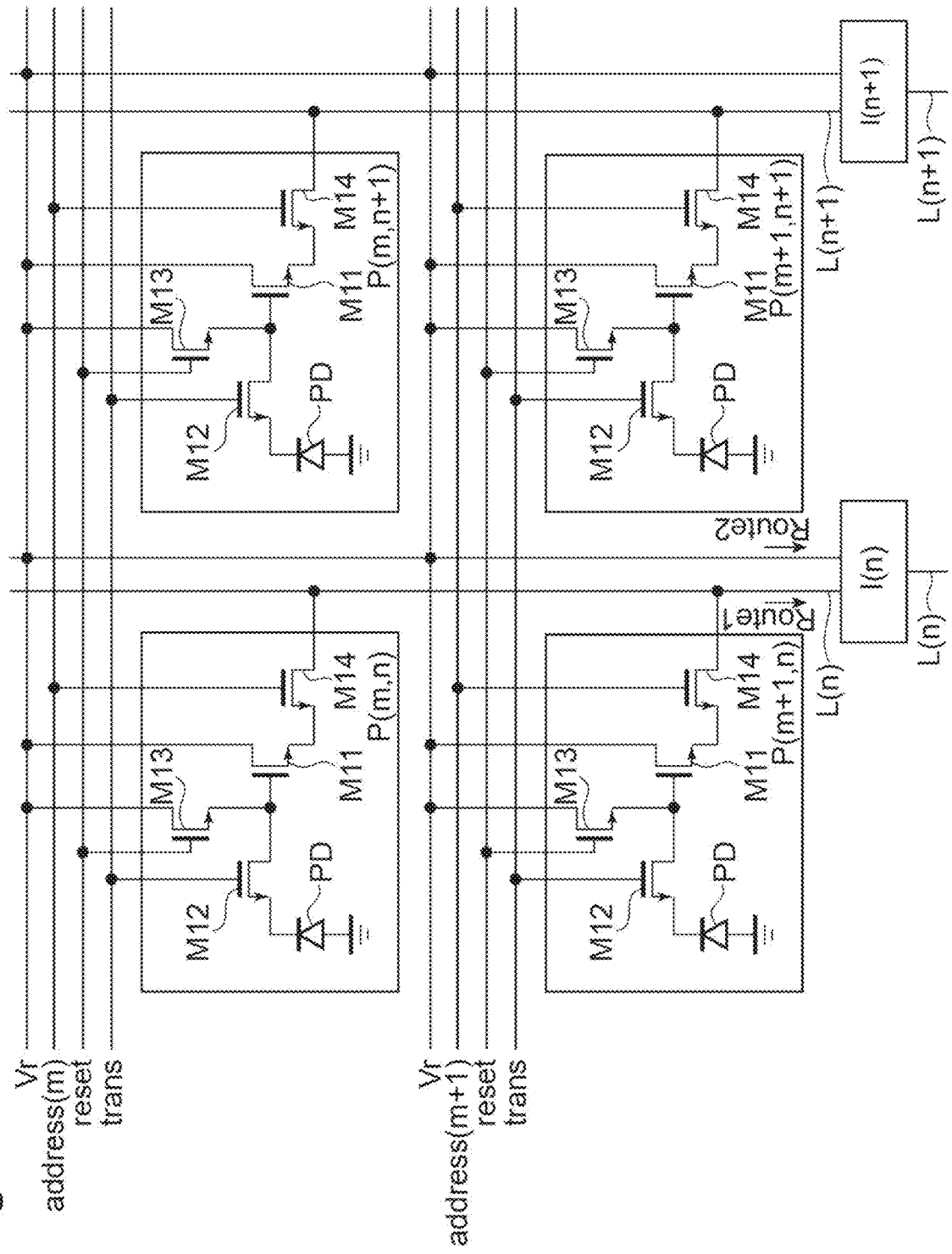
FIG. 10 is a diagram illustrating a circuit configuration of a pixel unit P(m, n) of the solid-state imaging device 1A and a connection of a current source I(n).

The present invention can be applied not only to a solid-state imaging device in which a plurality of pixel units are arrayed one-dimensionally, but also to a solid-state imaging device in which a plurality of pixel units are arrayed two-dimensionally as illustrated in FIG. 9 and FIG. 10.

FIG. 9 is a diagram illustrating a configuration of a solid-state imaging device 1A. When the configuration is compared with the configuration of the solid-state imaging device 1 illustrated in FIG. 1, the solid-state imaging device 1A illustrated in FIG. 9 is different in that M×N pixel units P(1, 1) to P(M, N) are two-dimensionally arrayed in the first direction and a second direction in a pixel array unit 10A. The second direction is a direction perpendicular to the first direction. The pixel unit P(m, n) is located in an m-th row and an n-th column. Among the M×N pixel units P(1, 1) to P(M, N), each of the M pixel units P(1, n) to P(M, n) located at the same position in the first direction outputs a signal to the common signal line L(n). N is an integer of 2 or more, and n is an integer of 1 or more and N or less. M is an integer of 2 or more, and in is an integer of 1 or more and M or less. In addition, an upper limit of M is about 4 in order to achieve desired effects.

FIG. 10 is a diagram illustrating a circuit configuration of the pixel unit P(m, n) and a connection of the current source I(n) in the solid-state imaging device 1A. The current source I(n) has the same configuration as those described with reference to FIG. 4 and the subsequent figures. The pixel unit P(m, n) includes the selection MOS transistor M14 in addition to the configuration described above.

In the pixel unit P(m, n), the selection MOS transistor M14 is provided between the amplification MOS transistor M11 and the signal line L(n). That is, a drain of the selection MOS transistor M14 is connected to a source of the amplification MOS transistor M11. A source of the selection MOS transistor M14 is connected to the signal line L(n). An address(m) signal is applied from the control unit 40 to a gate of the selection MOS transistor M14 of the pixel unit P(m, n). The signal line L(n) is commonly provided for the M pixel units P(1, n) to P(M, n) in an n-th column.

Two or more signals in the address(1) to address(M) signals output from the control unit 40 do not become at a high level at the same time. When the m-th address(m) signal among the address(1) to address(M) signals is at a high level, the selection MOS transistor M14 enters an ON state and a signal is output from the source of the amplification MOS transistor M11 to the signal line L(n) via the selection MOS transistor M14 in the N pixel units P(m, 1) to P(m, N) in an m-th row. The address(1) to address(M) signals sequentially become at a high level, and signals are sequentially output from the sources of the amplification MOS transistors M11 of the N pixel units to the signal lines for respective rows.

The first reference potential supply line (Vr supply line) for supplying the first reference potential Vr is provided for each row. The m-th Vr supply line extends in the first direction in which the N pixel units P(m, 1) to P(m, N) in the m-th row are arrayed. The m-th Vr supply line is a common line for supplying the first reference potential Vr to the drain of the amplification MOS transistor M11 and the drain of the initialization MOS transistor M13 in each of the N pixel units P(m, 1) to P(m, N) in the m-th row. The n-th current source I(n) is connected to the Vr supply line provided for each row.

The solid-state imaging device 1A configured in this way also has the same effects as the solid-state imaging device 1.

In addition, in the above solid-state imaging devices 1 and 1A, it is preferable for all of the N current sources I(1) to I(N) to have the configuration illustrated in FIG. 4, but it is not limited thereto. Hereinafter, the current source having the configuration illustrated in FIG. 4 is referred to as a specific current source, and the current source having the configuration illustrated in FIG. 2 is referred to as a normal current source (current source in the comparative example).

Depending on a degree to which fluctuation in the amount of current in the Vr supply line, that is, fluctuation in the voltage drop is allowed, any one or more current sources among the N current sources I(1) to I(N) may be the specific current sources, and the other current sources may be the normal current sources, and for example, the specific current sources and the normal current sources may be arranged alternately.

When it is assumed that the first reference potential Vr is applied from both ends to the Vr supply line, the current sources located near the ends of the Vr supply line among the N current sources I(1) to I(N) may be the specific current sources, and the current source near a center of the Vr supply line may be the normal current source.

When it is assumed that the first reference potential Vr is applied from only any one end to the Vr supply line, the current source on the side close to the one end of the Vr supply line among the N current sources I(1) to I(N) may be the specific current source, and the current source on the side far from the one end of the Vr supply line may be the normal current source.

The solid-state imaging device according to the present invention is not limited to the above embodiments and configuration examples, and various other modifications can be made.

The solid-state imaging device of the above embodiment is configured to include (1) a pixel array unit including a plurality of pixel units arrayed at least in a first direction and each including a photodiode and an amplification MOS transistor, and for outputting a signal according to an amount of charges generated in the photodiode in each of the plurality of pixel units to, among a plurality of signal lines, a signal line provided corresponding to the pixel unit; (2) a current source array unit including a plurality of current sources, each of the plurality of current sources being connected to the corresponding pixel unit among the plurality of pixel units via the signal line; and (3) a signal readout unit for inputting signals input via the plurality of signal lines, and sequentially reading out the signals according to the amounts of charges generated in the photodiodes in the plurality of pixel units.

In the above solid-state imaging device, in the pixel unit, the amplification MOS transistor is provided between a first reference potential supply line extending in the first direction and the signal line, a voltage according to the amount of charges generated in the photodiode is applied to a gate of the amplification MOS transistor, and a signal according to the gate voltage is output from the amplification MOS transistor to the signal line.

In the above solid-state imaging device, any one or more current sources among the plurality of current sources are specific current sources, and the specific current source includes (a) a first MOS transistor provided between a second reference potential supply terminal and a common node and having a gate to which a first bias voltage is applied; (b) a second MOS transistor provided between the common node and the signal line and having a gate to which a second bias voltage is applied; (c) a third MOS transistor provided between the first reference potential supply line and the common node; and (d) a setting circuit for applying a gate voltage according to a voltage of the signal line to a gate of the third MOS transistor to set ON/OFF of the third MOS transistor, and suppressing fluctuations in an amount of current flowing from the first reference potential supply line to the second reference potential supply terminal via the first MOS transistor and the common node.

In the above solid-state imaging device, the specific current source may further include a fourth MOS transistor provided between the first reference potential supply line and the third MOS transistor or between the third MOS transistor and the common node, and a third bias voltage may be applied to a gate of the fourth MOS transistor.

The above solid-state imaging device may further include a current limiting means for limiting a current flowing in the specific current source corresponding to the pixel unit in a period in which the pixel unit does not output the signal.

In the above solid-state imaging device, the setting circuit may include a fifth MOS transistor and a load connected in series with each other, the voltage of the signal line may be applied to a gate of the fifth MOS transistor, and a voltage at a connection point between the fifth MOS transistor and the load may be applied to the gate of the third MOS transistor.

In the above solid-state imaging device, the setting circuit may include a comparator for comparing the voltage of the signal line with a threshold value, and a voltage output from the comparator on the basis of the comparison result may be applied to the gate of the third MOS transistor.

In the above solid-state imaging device, in the pixel array unit, the plurality of pixel units may be arrayed also in a second direction perpendicular to the first direction, and each of the pixel units at the same position in the first direction among the plurality of pixel units may output the signal to the common signal line.

INDUSTRIAL APPLICABILITY

The present invention can be used as a solid-state imaging device capable of more reliably suppressing black level fluctuation.

REFERENCE SIGNS LIST 1, 1A—solid-state imaging device, 10, 10A—pixel array unit, 20—current source array unit, 30—signal readout unit, 40—control unit, L(1)—L(N)—signal line, P(1)-P(N), P(1, 1)-P(M, N)—pixel unit, PD—photodiode, M11—amplification MOS transistor, M12—transfer MOS transistor, M13—initialization MOS transistor, M14—selection MOS transistor, I(1)-I(N)—current source, M21—first MOS transistor, M22—second MOS transistor, M23—third MOS transistor, M24—fourth MOS transistor, M25—fifth MOS transistor, M26—sixth MOS transistor, M27—MOS transistor, SET—setting circuit, CMP—comparator.

The invention claimed is:

1. A solid-state imaging device comprising:
a pixel array unit including a plurality of pixel units arrayed at least in a first direction and each including a photodiode and an amplification MOS transistor, and configured to output a signal according to an amount of charges generated in the photodiode in each of the plurality of pixel units to, among a plurality of signal lines, a signal line provided corresponding to the pixel unit;
a current source array unit including a plurality of current sources, each of the plurality of current sources being connected to the corresponding pixel unit among the plurality of pixel units via the signal line; and
a signal readout unit configured to input signals input via the plurality of signal lines, and sequentially read out the signals according to the amounts of charges generated in the photodiodes in the plurality of pixel units; wherein
in the pixel unit, the amplification MOS transistor is provided between a first reference potential supply line extending in the first direction and the signal line, a voltage according to the amount of charges generated in the photodiode is applied to a gate of the amplification MOS transistor, and a signal according to the gate voltage is output from the amplification MOS transistor to the signal line, and
each of one or more specific current sources included in the plurality of current sources includes:
a first MOS transistor provided between a second reference potential supply terminal and a common node and having a gate to which a first bias voltage is applied;
a second MOS transistor provided between the common node and the signal line and having a gate to which a second bias voltage is applied;
a third MOS transistor provided between the first reference potential supply line and the common node; and
a setting circuit configured to apply a gate voltage according to a voltage of the signal line to a gate of the third MOS transistor to set ON/OFF of the third MOS transistor, and suppress fluctuations in an amount of current flowing from the first reference potential supply line to the second reference potential supply terminal via the first MOS transistor and the common node.

2. The solid-state imaging device according to claim 1, wherein the specific current source further includes a fourth MOS transistor provided between the first reference potential supply line and the third MOS transistor or between the third MOS transistor and the common node, and a third bias voltage is applied to a gate of the fourth MOS transistor.

3. The solid-state imaging device according to claim 1, further comprising a current limiting unit configured to limit a current flowing in the specific current source corresponding to the pixel unit in a period in which the pixel unit does not output the signal.

4. The solid-state imaging device according to claim 1, wherein the setting circuit includes a fifth MOS transistor and a load connected in series with each other, the voltage of the signal line is applied to a gate of the fifth MOS transistor, and a voltage at a connection point between the fifth MOS transistor and the load is applied to the gate of the third MOS transistor.

5. The solid-state imaging device according to claim 1, wherein the setting circuit includes a comparator configured to compare the voltage of the signal line with a threshold value, and a voltage output from the comparator on the basis of the comparison result is applied to the gate of the third MOS transistor.

6. The solid-state imaging device according to claim 1, wherein, in the pixel array unit, the plurality of pixel units are arrayed also in a second direction perpendicular to the first direction, and each of the pixel units at the same position in the first direction among the plurality of pixel units outputs the signal to the common signal line.

* * * * *